(12) United States Patent
Ostermann et al.

(10) Patent No.: US 6,947,045 B1
(45) Date of Patent: Sep. 20, 2005

(54) CODING OF ANIMATED 3-D WIREFRAME MODELS FOR INTERNET STREAMING APPLICATIONS: METHODS, SYSTEMS AND PROGRAM PRODUCTS

(75) Inventors: Jörn Ostermann, Morganville, NJ (US); Socrates Varakliotis, Volos (GR)

(73) Assignee: AT&T Corporation, New York, NY (US)

(*) Notice: Subject to any disclaimer, the term of this patent is extended or adjusted under 35 U.S.C. 154(b) by 579 days.

(21) Appl. No.: 10/198,129

(22) Filed: Jul. 19, 2002

(51) Int. Cl.$^7$ .............................................. G06T 15/00
(52) U.S. Cl. ..................................................... 345/473
(58) Field of Search .................................. 345/473, 474, 345/475, 619, 418, 419

(56) References Cited

U.S. PATENT DOCUMENTS

| | | | |
|---|---|---|---|
| 5,818,463 A | 10/1998 | Tao et al. .................... | 345/473 |
| 6,047,088 A | 4/2000 | van Beek et al. ........... | 382/243 |
| 6,262,737 B1 | 7/2001 | Li et al. ...................... | 345/419 |
| 6,339,618 B1 | 1/2002 | Puri et al. .................. | 375/240.16 |
| 6,661,418 B1 * | 12/2003 | McMillan et al. .......... | 345/473 |

OTHER PUBLICATIONS

"Successful Multiparty Audio Communication Over the Internet", V. Hardman et al., Communications *of the ACM*, pp. 74–80, vol. 41, No. 5, May 1998.

"*vic: A Felxible Framework for Packet Video*", S. McCanne et al., ACM *Multimedia '96*, pp. 511–522, San Francisco, CA. Nov. 1998.

"*RTP: A Transport Protocol for Real Time Applications*", H. Schulzrinne, S. Casner, R. Frederick, V. Jacobson, RFC 1889, Internet Engineering Task Force, Jan. 1996.

"*Guidelines for Writers of RTP Payload Format Specifications*", M. Handley et al., pp. 1–8, RFC 2736, Internet Engineering Task Force. Dec. 1999.

* cited by examiner

*Primary Examiner*—Phu K. Nguyen
(74) *Attorney, Agent, or Firm*—Joseph C. Redmond, Jr.; Morgan & Finnegan, LLP

(57) ABSTRACT

A 3-D wireframe model expressed in terms of nodes and vertices receives a 3-D video or like signal representative of a scene expressed in terms of a reference model, I frames and P frames. A DPCM coder takes advantage of the temporal correlation of the displacement of each vertex along every axis in the 3-D space. The 3-D signal is a set of non-zero displacements of all vertices and all nodes ($s_i[n, v]$) at time $t_i$. The decoded set (animation frame) of the previous instance is used as the predicted value ($s_{i-1}[n, v]$). The prediction error $e_i[n, v]$, i.e. the difference between the current displacement set and the predicted one, is computed and quantised ($e_i[n, v]$). Finally, the quantised samples are entropy coded ($c_i[n, v]$) using an adaptive arithmetic coding algorithm to handle the unknown data statistics. The predictive scheme described above prevents quantization error accumulation. A DPCM decoder first decodes arithmetically the received samples ('e' [n, v]) and computers the decoded samples ($s_i'$ [n, v]).

25 Claims, 7 Drawing Sheets

Encoder

FIG. 2

NODE MASK CORRESPONDING TO FIG. 1 — 200

| Node | Animated |
|---|---|
| Head | 0 |
| Face | 1 |
| Lips | 1 |
| Upper Lip | 1 |
| Lower Lip | 0 |
| Nostril | 0 |
| Teeth | 0 |
| Ears | 0 |
| Ear L | 1 |
| Ear R | 0 |
| Tongue | 1 |
| Skin | 1 |
| Eyes | 0 |
| . | . |
| . | . |
| . | . |

FIG. 3

VERTEX MASK CORRESPONDING TO A NODE TO BE ANIMATED

Node Name: Face

| Vertex No. | Animated Coordinate | | |
|---|---|---|---|
| | X | Y | Z |
| 0 | 1 | 0 | 0 |
| 1 | 1 | 1 | 1 |
| 2 | 1 | 0 | 1 |
| 3 | 0 | 1 | 1 |
| 4 | 0 | 0 | 0 |
| 5 | 0 | 1 | 0 |
| 6 | 0 | 0 | 1 |
| 7 | 0 | 0 | 0 |
| ⋮ | ⋮ | ⋮ | ⋮ |

FIG. 7

Component compression Efficiency (bits/sample)

| I-frame | Only frame 1 | | | Every 20 frames | | | | | | Every 8 frames | | |
|---|---|---|---|---|---|---|---|---|---|---|---|---|
| Quantiser levels | x | y | z | x | y | x | x | y | z | x | y | z |
| 256 | 4.80 | 5.67 | 5.85 | 4.84 | 5.79 | 5.89 | 4.91 | 5.95 | 5.97 |
| 128 | 4.37 | 5.21 | 5.27 | 4.41 | 5.32 | 5.31 | 4.47 | 5.45 | 5.39 |
| 64 | 3.84 | 4.75 | 4.70 | 3.88 | 4.83 | 4.74 | 3.94 | 4.95 | 4.81 |
| 32 | 3.39 | 4.28 | 4.23 | 3.41 | 4.33 | 4.25 | 3.48 | 4.42 | 4.29 |

Compression efficiency per component x, y, z for various quantiser step sizes and I-frame position.

CODING OF ANIMATED 3-D WIREFRAME MODELS FOR INTERNET STREAMING APPLICATIONS: METHODS, SYSTEMS AND PROGRAM PRODUCTS

BACKGROUND OF INVENTION

1. Field of Invention

This invention relates to computer animation, methods, systems and program products. More particularly, the invention relates to animated 3-D wireframe models encoded/decoded for Internet streaming application; methods, systems and program products.

2. Description of Prior Art

Image, video, audio and computer graphics represent a major source of multimedia in the present time. Increasing demand of modem applications such as audio and video conferencing or IP telephony has led audio, video and still image media to become particularly popular and fuelled further research and development in the processing of their signal, as well as in multimedia communications. As a result, international standardization effort took place.

Applications such as digital TV broadcasting, interactive 3-D games and e shopping combined with the high popularity of the Internet are rapidly changing the scenery demanding richer interactive multimedia services. Existing media gain new importance: 3-D graphics and animation are among them. Despite the existence of a plethora of file formats and encodings for 3-D data i.e. Virtual Reality Modeling Language (VRML 2.0), an efficient compression and animation framework is sought in the context of Motion Picture Expert Group (MPEG-4).

MPEG-4 attempts to provide the state-of-the-art standard that covers among others the aforementioned areas of 3-D scene compression and delivery through a tool set called Binary Format for Scenes (BIFS) BIFS is the compressed binary format in which 3-D scenes are defined, modified (BIFS-Command) and animated (BIFS-Anim). BIFS is derived from VRML that it extends by preserving backward compatibility. In addition to BIFS, the Synthetic/Natural Hybrid Coding (SNHC) tools yield reasonably high compression for still textures, face and body animation, and 3-D mesh coding. In MPEG-4, the two main animation tools, BIFS-Anim and 'face-anim' are based on a Differential Pulse Code Modulation (DPCM) system and arithmetic encoding that allows for low delay coding.

Designing a codec suitable for the best-effort Internet requires, besides the signal-processing domain, special consideration of the channel characteristics. These refer to packet loss, reordering and duplication, delay, delay variation (jitter) and, even fragmentation. Traditional packet audio/video tools, such as Robust Audio Tool (RAT) described in "Successful Multiparty Audio Communication over the Internet" by V. Hardman, M. A. Sasse, I. Kouvelas published in Communications of the ACM, Vol. 41, No. 5, 1998 and Video Conference Tool (VIC) described in "vic: A Flexible Framework for Packet Video" by S. McCanne, V. Jacobson published in ACM Multimedia '95, San Francisco, Calif. November 1998), Both tools use Real-Time Transport Protocol (RTP) described in "RTP: A Transport Protocol for Real Time Applications" by H. Schulzrinne, S. Casner, R. Frederick, V. Jacobson, published in RFC 1889, Internet Engineering Task Force. January 1996 and include adaptive playout buffering algorithms to cope with variable delay. Loss is not possible to predict, whether it is expressed in the short-term as some packets being independently dropped or in the longer-term in the form of loss bursts or network outages. In such cases, an error resilience scheme is desirable along with a good payload format design. Best common practice guidelines for writers of RTP payload formats are provided in "Guidelines for Writers of RTP Payload Format Specifications" by M. Handley, C. Perkins, published in RFC 2736, Internet Engineering Task Force. December 1999.

What is needed in the art is a coding technique for 3-D animated wireframe models suitable for Internet streaming applications, corrected for short-term and short average length bursts of up to 30%.

Prior art related to computer animation includes:

U.S. Pat. No. 5,818,463 entitled "Data Compression For Animated Three Dimensional Objects", issued Oct. 6, 1998 discloses data which represents an animation sequence of a three dimensional object at a series of discrete time frames compressed by identifying characteristic features of the object; generating a quadrangular mesh representation of the object, whereby the object is mathematically defined by dividing it into one or more regions and hierarchically representing each region by a mesh, each mesh including three coordinate matrices which define the positions of nodes within the mesh; selecting from the mesh representation of the features a set of animation parameters which are capable of specifying changes in the mesh corresponding to the animation of the object; compressing each region mesh by applying pyramid progressive coding to the coordinate matrices for the mesh; storing the initial values for the animation parameters at the beginning of the animation sequence; and, at each time frame after the beginning of the animation sequence, estimating the current values of the parameters and compressing each parameter by estimating the change in the value of the parameter by subtracting its stored value for the previous time frame from its current value, quantizing the estimated difference, applying entropy coding to the quantized difference and updating the stored value with the decoded value.

U.S. Pat. No. 6,047,088 entitled "2D Mesh Geometry And Motion Vector Compression", issued Apr. 4, 2000 discloses coding video data permits coding of video information with optional, enhanced functionality's. Video data is coded as base layer data and enhancement layer data. The base layer data includes convention motion compensated transform encoded texture and motion vector data. Optional enhancement layer data contains mesh node vector data. Mesh node vector data of the enhancement layer may be predicted based on motion vectors of the base layer. A back channel permits a decoder to affect how mesh node coding is performed in the encoder. The decoder may command the encoder to reduce or eliminate encoding of mesh node motion vectors. The back channel finds application in single layer systems and two layer systems.

U.S. Pat. No. 6,339,618 entitled "Mesh Node Motion Coding To Enable Object Based Functionality's Within A Motion Compensated Transform Video Coder", issued Jan. 15, 2002 discloses single and progressive-resolution coding algorithms for the compression of 3-D polyhedral meshes. In the single-resolution mode, the mesh topology (or connectivity) is encoded by a constructive traversing approach applied to the dual graph of the original mesh while the mesh geometry is encoded by successive quantization and the bit-plane coding (achieved by context arithmetic coding). In the progressive-resolution mode, the mesh is represented by a coarse approximation (i.e., the base mesh) and a sequence of refinements. Both the base mesh and the refinement operations are entropy coded so that a series of mesh models of continuously varying resolutions can be constructed from the coded bit stream. Topological and geometrical data of a 3-D mesh are encoded separately according to their importance and then integrated into a single bit stream. In decoding, the decoder finds from the bit stream the most important information and gradually adds finer detailed information to provide a more complete 3-D graphic model. The decoder can stop at any point while giving a reasonable reconstruction of the original model.

U.S. Pat. No. Application Publication 20010028744 entitled "Method For Processing Nodes In 3D Scene An Apparatus Thereof", published Oct. 11, 2001 discloses a method and apparatus for processing nodes in 3-dimensional (3D) scene. The method includes the steps of identifying a 3D mesh node having 3D mesh information representing a 3D shape which is formed by constructing faces from vertices among nodes contained in a 3D scene to be processed; and encoding or decoding the identified 3D mesh node. Also, the method includes the step of transmitting or storing the 3D mesh information of the encoded 3D mesh node through an independent stream separate from the 3D scene description stream. According to the method, a node representing 3D mesh information having a huge volume of information in a 3D scene can be efficiently encoded and decoded so that the 3D scene can be efficiently transmitted and stored. By transmitting and storing 3D mesh information of a node representing encoded 3D mesh information, through an independent stream separate from 3D scene description information, the entire 3D scene cannot be affected even though encoded 3D mesh information has a huge volume.

None of the prior art discloses or suggests a coding scheme for 3-D wireframe models suitable for Internet streaming applications where the compression scheme gives efficient coding of IndexedFaceSet nodes and generates animation bitmasks similar to those in BIFS-Anim, and copes with delay and jitter in a robust manner to handle higher-level animations. The resulting bitstream has a flexible format for direct RTP packetization to use in IP streaming applications suitable for real-time applications such as videoconferencing and e-commerce avatars.

INVENTION SUMMARY

A 3-D wireframe model expressed in terms of nodes and vertices is created and receives a 3-D video signal representative of a scene expressed in terms of a reference model $I_0$, I and P frames. The reference model is assumed to be already available at the decoder. The model might be stored or transmitted previously. The 3D wireframe model includes a Node table, which lists all IndexedFaceSet nodes in the scene to be animated. A NodeMask is created in bit form where each bit, if set, denotes the corresponding IndexedFaceSet node in the Node Table that will be animated. Similarly, VertexMasks are created, one per axis or one per vertex and denote the vertices to be animated. An output signal generated from wireframe model takes advantage of the temporal correlation's of the displacement of each vertex along every axis in the 3-D wireframe based upon the 3-D video signal. The output signal s (i)[n, v] is the set of non-zero displacements of all vertices and nodes at time t (k) and is provided to an Encoder as the I frame. In case the Encoder chooses to code the information as a P-frame, a decoded set of the previous instance of all vertices is used as predicted value s'(i−1)[n, v]. A prediction error e (i)[n, v] is calculated as the difference between s (i)[n, v] and s' (i−1)[n, v] and quantized as e (j)[n, v]. In case the Encoder decides to code the information as an I-frame, the input signal s (i)[n, v] is quantized as e (j)[n, v]. The quantized samples are entropy coded using an adaptive arithmetic coding algorithm and provided to a decoder as a streaming packetized signal in Real-Time Transport Protocol (RTP) format for Internet applications. A differential pulse code modulator decodes arithmetically the received samples and computes the decoded samples s' (j)[n, v].

An aspect of the invention provides a 3D signal representative of a dynamic scene expressed in terms of a reference model, I frames, and P-frames to a 3D wireframe model expressed in terms of Nodes and Vertices and generating a Node Table listing all IndexFace Set nodes in the scene;.

Another aspect forms a NodeMask and Vertex Mask in bit form for the 3D wireframe model and sets bits in the NodeMask and VertexMask denoting the nodes in the IndexedFaceSet to be animated;

Another aspects generate an output signal from the wireframe model, which is a set of non-displacement of all vertices and nodes at time [t (k)] and generates a predicted value from the output signal;

Another aspect calculates a prediction error signal based upon the output signal and quantized the prediction error signal as quantized samples which are entropy encoded and packetized in an RTP format for Internet streaming applications.

DESCRIPTION OF DRAWINGS

The invention will be further understood from the following detailed description of a preferred embodiment taken in conjunction with an appended drawing, in which:

FIG. 2 is a representation of a Node mask set for animation of the Telly model of FIG. 1;

FIG. 3 is a representation of a Vertex mask corresponding to a node set for animation of the Telly model of FIG. 1;

FIG. 7 is a table of compression efficiency per component x, y, z for various quantizer step sizes and I frame position

DESCRIPTION OF PREFERRED EMBODIMENT

Figure 1:
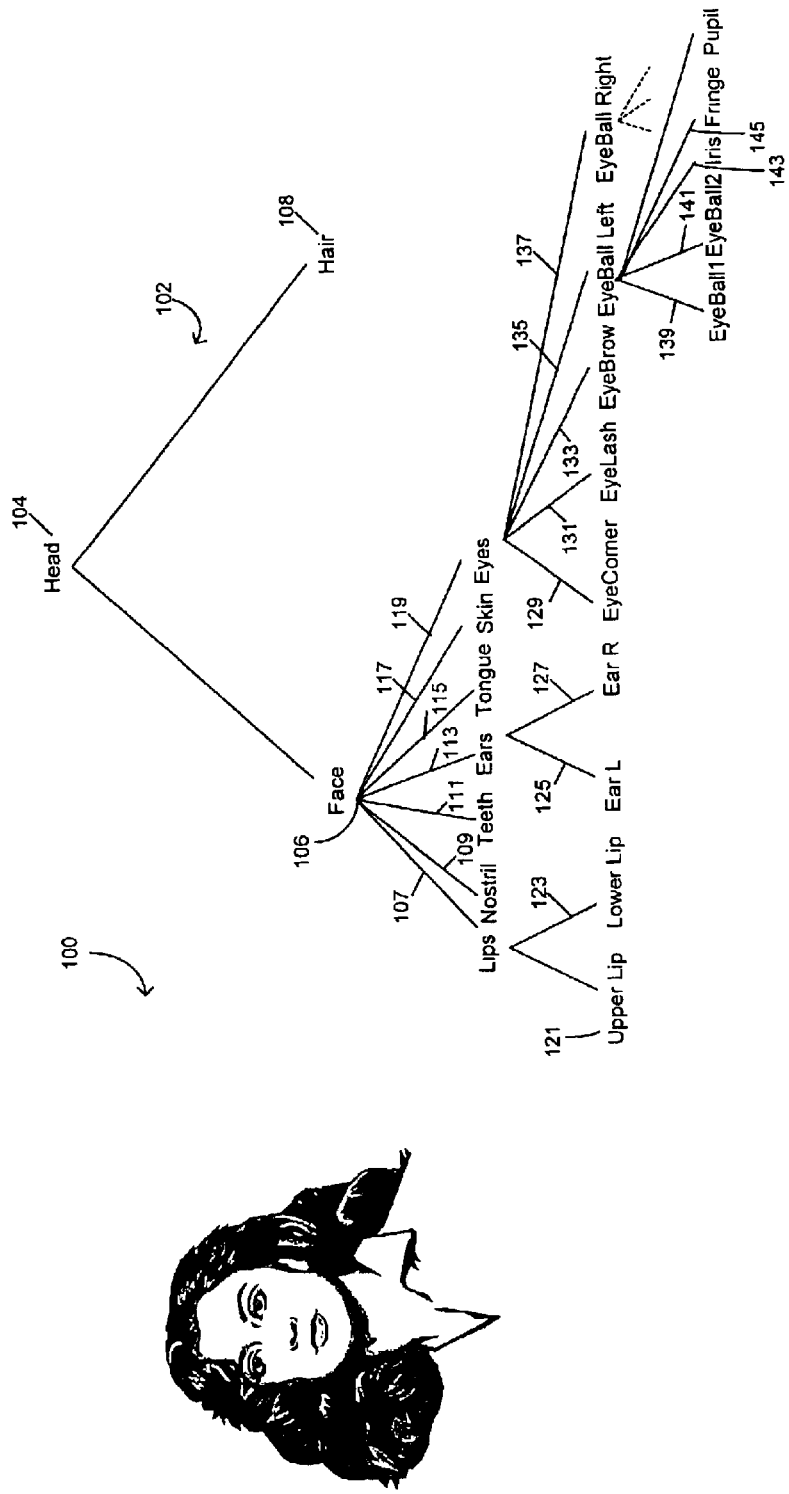
FIG. 1 is a representation of a 3-D wireframe model "Telly" with an accompanying scene graph.

An overview of the computer animation process to wire frame models is believed to be appropriate for better understanding of the present invention. An example of a 3-D wire frame model is disclosed in U.S. Pat. No. 6,304,264 B1, issued Oct. 16, 2001 and assigned to the same assignee as that of the present invention. Briefly, the 3-D wireframe model includes a plurality of nodes linked to other nodes by vertices in a Cartesian coordinate system. The movement of the wireframe model can be reflected in terms of changes in the positions of the vertices of the wireframe model.

The animation process begins with the server sending a receiver a wire frame model named reference model stored in the server. Alternatively, the reference model could be resident to the receiver. Displacement vectors (Changes to the vertex positions of the server wire frame model) are transmitted to the receiver wire frame model in "I" and "P" frames. An I frame represents the change of the wireframe nodes and vertices at an instant in time with respect to the reference model. The I frame can be encoded and transmitted to the receiver where it is decoded wit respect to the reference model but without respect to any previous I or P frame. The receiver wire frame model is deformed by the I frame to correspond to the server wire frame model, less distortion due to transmission losses and quanitzation. This is achieved by adding the transmitted displacement vectors to the positions of the corresponding vertices. A P frame transmitted by the server describes the deformation of the wireframe due to movement in the server wire frame model, using the decoded wire frame model of the previous frame. This previous frame could be coded as an I or P frame Each P frame is transmitted to the receiver and added to the receiver wire frame model to correspond to the server model, less distortion due to transmission losses and quanitzation. P frame coding and transmission continues until distortion losses reach a level where the sending and receiver wireframe are not in sufficient correspondence. At this point, another I frame is transmitted without reference to any previous I- or P-frame to restore the sending and receiving wireframe to correspondence thereby compensating for transmission and quanitzation losses. The process continues sending I frames without reference to previous frames followed by P frames which relate to changes from the previous P frame until distortion reaches a level where a new I frame is transmitted to the receiver. The decision on whether to send an I or P frame depends on the application and network conditions. In order to accommodate for packet loss, the server will send I frames periodically—where the frequency of I-frames is determined by the server's estimate of the network condition. This estimate might be based on feedback packets received from a receiver. Alternatively, the receiver may request the server to send an I frame. The receiver might send this request if it lost more than a predefined number of packets. In order to enable receivers to join into an ongoing transmission, the sender will send I frames in regular intervals.

Now turning to FIG. 1, a wire frame model "Telly" 100, a talking head, is disclosed with a scene graph 102 for animation purposes. The animation sequence is the talking head speaking a sentence that lasts for 190 frames at 30 Hz (approx. 6 secs.). The model smiles towards the end of the sentence. The mouth movement and facial expressions are achieved by shifting vertices in an IndexedFaceSet.

The scene graph describes a Head node 104 linked to a Face node 106 and a Hair node 108 in an IndexedFaccSet for animation purposes. The Hair node is not involved and not animated. The Face node 106 is linked to seven (7) nodes including Lips 107, Nostril 109, Teeth 111, Ears 113, Tongue 115, Skin 117 and Eyes 119. The Lips include an Upper Lip 121 and the Lower Lip 123, as sub-nodes. The Ear node includes Ear L 125 and Ear R 127, as sub-nodes. The Eyes 109 include the EyeCorner 129; the EyeLash 131; the EyeBrow 133; the EyeBall Left 135; the EyeBall Right 137, as sub-nodes. The EyeBall Left and Right includes further sub nodes including EyeBall (1) 139; EyeBall (2) 141, the Iris 143; the Fringe 145 and the Pupil 147. The nodes of the IndexedFaceSet to animated include the Skin 117, Upper Lip 121, Lower Lip 123, Eye Corner 129, Eye Lash 131, Eye Brow 133 and Nostrils 109.

In order to describe nodes in the model to be animated, a Node Mask is defined for each node. In FIG. 2, a Node Mass 200 includes a list of nodes 201 corresponding to those nodes appearing in the scene graph of FIG. 1. An animation column 203 is a bit map of nodes to be tracked for animation or disregarded. A bit setting of "1" for a node indicates a node is be tracked for animation. In this case, a Vertex Mask (see FIG. 3) is defined for this node. A bit setting of "0" indicates the node is to be disregarded for animation purposes.

In FIG. 3, a Vertex Mask 300 defines the vertices associated with a Node in terms of X, Y and Z coordinates. FIG. 3 defines the Vertex Mask for the Face Node 106. Each tracked Node has a like Vertex Mask table. A Vertex column 301 lists each vertex of a tracked node by number. A bit map 303 describes the nodes to be animated in terms of X, Y and Z coordinates where a bit setting of "1" indicates a coordinate to be tracked for movement as representative animation in the wireframe model and a bit setting of "0" indicates the coordinate of the sub-node is to be disregarded for animation purposes.

Figure 4:
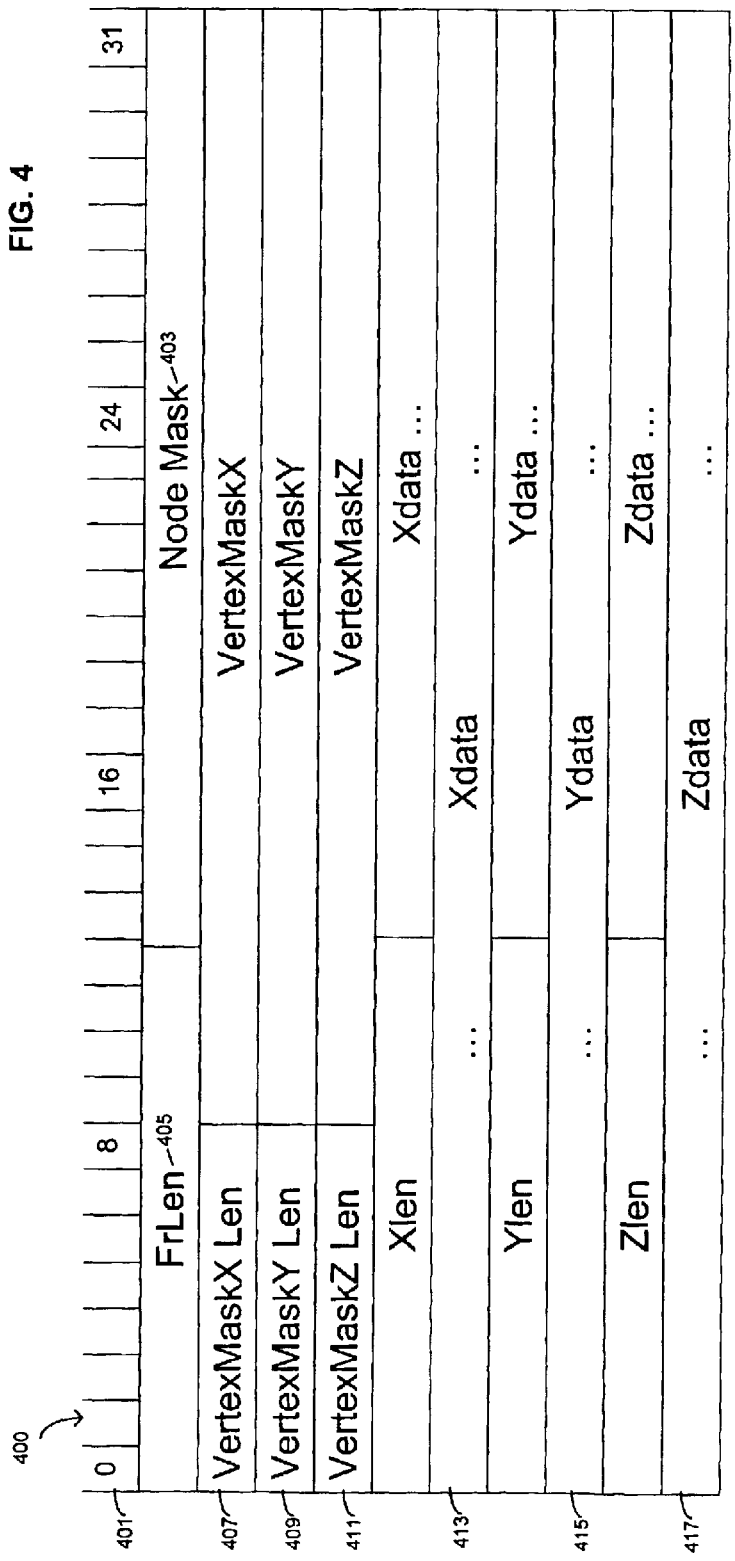
FIG. 4 is a representation of a packet format for packetized signals sent from a wireframe model server to a wireframe model receiver.

Based on the node and vertex movements of the wire frame model in FIG. 2 and FIG. 3, respectively, signals are generated and transmitted as encoded I and P frames in RTP packets. FIG. 4 describes a packet format 400 for one P frame, which represents one application data unit (ADU) for a Node and its Vertex Masks in a scene graph. As movement occurs in the wireframe model, the signals representative of the movement are encoded, and sent as packets are sent for those nodes that have movement in terms of the changing vertices at that node. Each packet may have a bit length 401 of 32 bits, separated into layers for Node Masks 403 and Vertex Masks 405. Each Node Mask and Vertex Mask are defined in terms of X, Y and Z coordinates in layers 407, 409 and 411. The encoded X, Y and Z data signal are included in layers 413, 415, and 417 At the decoder, the encoded data is stripped off the packet, sent to the appropriate node for altering the position of the vertices according to the P or I Fame data.

Figure 5A:
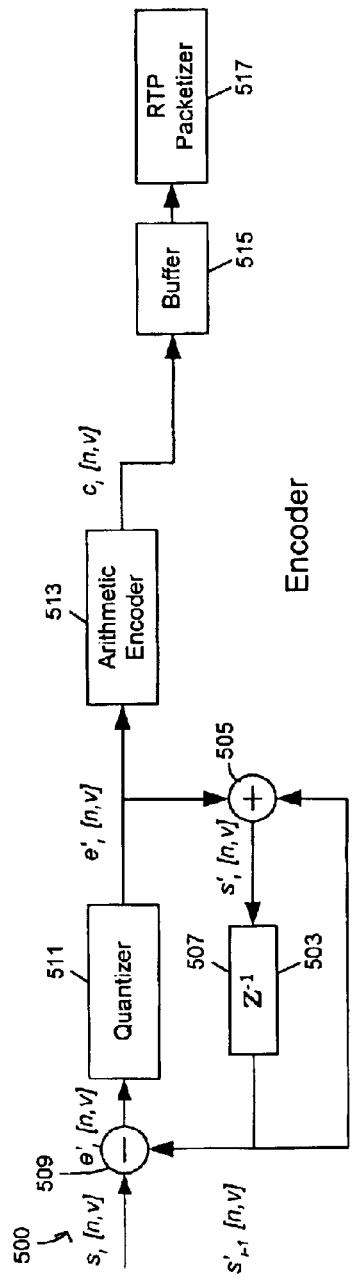
FIG. 5A is a circuit diagram of an encoder incorporating the principles of the present invention for coding of signals in packetized format in an Internet streaming application for the animated 3-D wireframe models of FIG. 1.

In FIG. 5A, a DPCM encoder 500 takes advantage of the temporal correlation of the displacement of each vertex along every axis in the 3-D space. A set of non-zero displacements of all vertices and all nodes is generated as a signal $(s_i[n, v])$ at time $t_i$ where $s_i$ is the input signal from the wireframe model, n is a wireframe node experiencing movement and v is the vertex mask associated with the node. The signal $s_i[n, v]$ is provided as an input to the encoder 500. A predictor circuit 503 includes an adder 505 and delay line 507 to generate a predicted value $(s'_{i-1}[n, v])$ where n, v have been previously defined and $s'_{i-1}$ is the predicted value from the decoded set (animation frame or 3D wireframe of the previous instance) by summing the output of the encoder prior to encoding. The predicted value is compared to the input signal $s_i[n, v]$ in a subtractor 509 to obtain a prediction error $(e_i[n, v])$. where n and v have been previously defined and e is the difference between the current displacement set and predicted one. An alternative Predictor may predict the displacement of a vertex $s_i[n, v]$ as a function of previously transmitted values $s'_{i-1}$ as well as those vertices $s_i[n', v']$ of the current frame $t_i$ that are already coded prior to coding $s_i[n, v]$. The predicted error is quantized in quantizer 511 and provided as an input $(e'_i[n, v])$ to an arithmetic encoder 511 and to the prediction circuit 503. The encoder controls the quantization step size. Larger quantization step sizes will reduce the bit rate, smaller sizes will increase the bit rate. The encode might change the quantizer stepsize to control the fullness of the optional buffer for constant bit rate applications or to avoid peaks in transmission rate. The quantized samples are entropy encoded as ($c_i$[n, v]) where $c_i$ is the encoded sample for the node n and the vertex v associated with the node The encoding is executed in an arithmetic encoder 513 using an arithmetic coding algorithm to handle the unknown data statistics and providing the output signal $c_i$[n, v] to a buffer 515 to an input to RTP Packetizer 517 which sends the signal in properly formatted RTP packets to the Internet. The encode might choose to use an adaptive arithmetic coder in order to achieve better compression. In this case, we recommend that the statistics of the adaptive arithmetic encoder and decoder be reset every now and then, either by explicit signal from the encoder or with every I-frame.

Figure 5B:
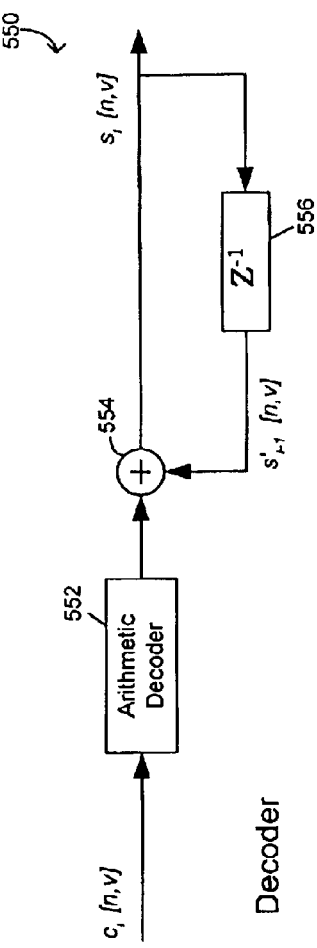
FIG. 5B is a circuit diagram of a decoder incorporating the principles of the present invention for decoding of signals representative in packetized format in an Internet streaming application for the animated 3-D wireframe model of FIG. 1.

In FIG. 5B, a decoder 550 receives the RTP packets in the RTP Packet decoder. The RTP Packet decoder delivers the encoded quantized samples $c_i$[n, v] in an arithmetic decoder 552 and computes the decoded sample ($s_i$[n, v]) by summing the previous output signal $s'_{i-1}$[n, v] in an adder after delay 556. In case a packet is lost, the Packet decoder sends a signal to enable error concealment. The decoder may choose from different error concealment methods including: Repeat the information from the previous frame, i.e. linearly exptrpolate previous motion; Apply no motion for the frame that the missing packet covers.

Summarizing, the present invention encodes those vertices in the wireframe model with non-zero displacements in all 3 dimensions. At a frame level, only those nodes are considered with at least one vertex changing between frames. This process may generate sequences where not all nodes appear from frame $F_I$ to frame $F_{i+1}$. It may even be the case that no change between consecutive frames, thus generating "empty frames". This property resembles the silence period inherent in speech audio streams and can be exploited in the application using RTP to build delay adaptive receivers that absorb network jitter. Further more interstream synchronization can be achieved, which is paramount for many applications (e.g. lip synchronization of a virtual salesman with packet speech).

Figure 6:
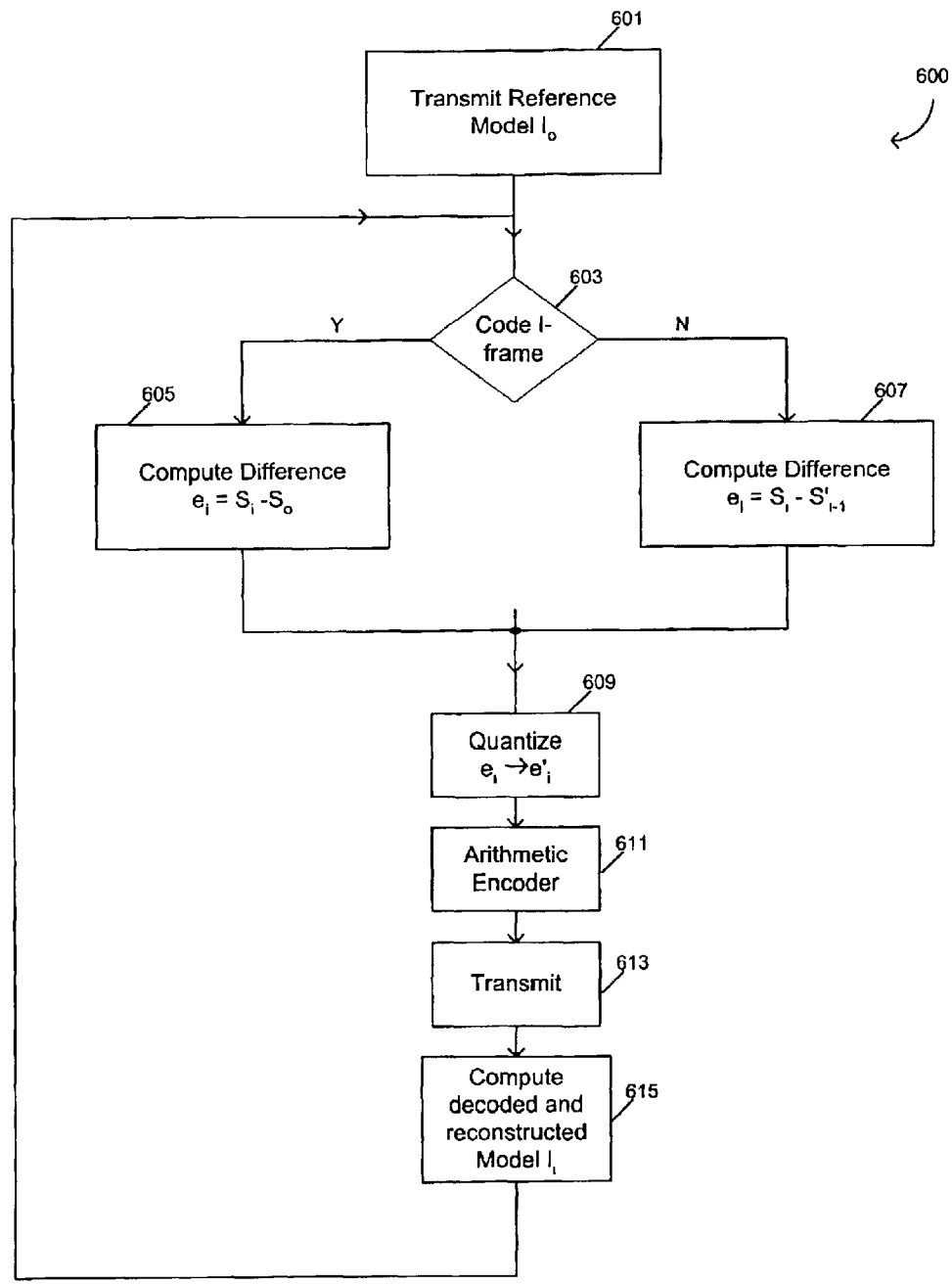
FIG. 6 is a flow diagram for encoding and decoding 3-D animated wireframe model signals for Internet streaming applications. Labels inconsistent with FIG. 5 and Invention Summary

FIG. 6 is a flow diagram 600 of the process for encoding animated signals transmitted from a server wire frame model to a receiver wire frame model. In block 601, the server wire frame model ($I_O$) is transmitted as an I frame to the receiver wire frame model using previously known methods. A test 603 is performed in the encoder 500 (See FIG. 5A) to determine whether the I frame should be encoded. In block 605, a "yes" condition computes the difference signal $e_i = s_I - s_O$ where $s_i$ is the current I frame and $S_O$ is the reference model. In block 607, a "no" condition computes the difference for a predicted value $e_I = s_i - s_{i-1}$, where $s_{i-1}$ is the wireframe model of the previous frame as decoded by the receiver assuming errorfree transmission. In order to increase coding efficiency and to achieve irrelevance reduction, both the I frame and P frame signals are quantized in block 609 to obtain digitized samples $e_i -> e'_I$. The quantized signals arc arithmetically encoded in block 611 and transmitted in block 613 to the receiver as a streaming Internet application using a packet format such as described in FIG. 4. The signal is decoded in a decoder 550 (See FIG. 5B) to compute, decode and reconstruct model I in block 615 for application to the wireframe model of the receiver. The process returns to block 601 to repeat the process for the next frame I or P frame whereby the changes in a server wireframe model are transmitted to a receiver wireframe model FIG. 7 describes the compression efficiency per vertex component x, y and z, assuming the same quantization step size for all nodes. The quantization range of each node for the x-axis was the difference between the maximum and minimum displacement of all vertices of the node along the axis. The same process was repeated for the y and z axes. Other implementations may choose to use a predefined range for the quantization range, or to adapt the range for each frame to be transmitted. It is also useful to use small ranges for P frames and large ranges for I frames. An example uses a range that is 5 times larger for I frames than for P frames.

While the invention has been described in terms of a preferred embodiment various changes can be made therein without departing from the spirit and scope the invention, as defined in the appended claims, in which:

We claim:

1. A method of coding 3D animated wireframe models suitable for Internet streaming applications, comprises:
   a) providing a 3D signal representative of a scene expressed in terms of a reference model, I frames and P frames to a 3-D wire frame model expressed in terms of Nodes and Vertices;
   b) generating a Node Table listing all IndexFace Set nodes in the scene; and
   c) forming a NodeMask and Vertex Mask in bit form for the 3D wireframe model.

2. The method of claim 1 further comprising:
   d) setting bits in the NodeMask denoting the nodes in the scene to be animated.

3. The method of claim 2 further comprising:
   e) for Nodes set in the NodeMask, setting bits in the VertexMask deniting the vertices in the node to be animated.

4. The method of claim 3 further comprising:
   f) transmitting these Masks for every frame.

5. The method of claim 3 further comprising:
   g) transmitting these Masks only if they differ from those of the pervious frame.

6. The method of claim 3 further comprising;
   h) generating an output signal from the wireframe model which is a set of non-zero displacement of all vertices and nodes at time [$t_i$].

7. The method of claim 6 further comprising:
   i) generating a predicted value from the previous output signal [$t_i$].

8. The method of claim 7 further comprising:
   m) calculating a prediction error signal based upon the output signal and the predicted value.

9. The method of claim 8 further comprising:
   n) quantizing the prediction error signal as quantized samples.

10. The method of claim 9 further comprising:
    o) entropy encoding the quantized samples using an arithmetic coding algorithm.

11. The method of claim 10 further comprising:
    p) packetizing the encoded quantized samples in an RTP format for Internet streaming applications.

12. The method of claim 6 further comprising
    j) generating a predicted value from the previously ccoded output signal [$t_{i-1}$].

13. The method of claim 6 further comprising:
   k) generating a predicted value from the previously coded output signal at time $t_l$.

14. The method of claim 6 further comprising:
   l) generating a predicted value from the previously decoded 3D wireframe model.

15. The method of claim 1 further comprising:
   q) arithmetically decoding the quantized samples; and
   r) computing the decoded quantized samples.

16. A system for coding 3D animated wireframe models suitable for Internet streaming applications, comprising:
   a) a 3D animated wireframe model expressed in terms of nodes and vertices
   b) receiving apparatus, which receives a 3D signal of a scene including animation at the wireframe model;
   c) an encoder which receives output signals from the wireframe model, the output signals indicative of the non-zero displacements of nodes and vertices at time $[t_l]$; and
   d) the encoder computing, quantizing and arithmetically encoding the prediction error signal as quantized samples.

17. The system of claim 16 further comprising:
   e) packetizing apparatus which packetizes the quantized samples for Internet streaming applications in the RTP format.

18. The system of claim 17 further comprising:
   f) decoding apparatus which arithmetically decode the prediction error samples and computes the coded samples.

19. A method for coding 3D animated wireframe models suitable for Internet streaming applications, comprising:
   a) expressing a 3D animated wireframe model in terms of nodes and vertices
   b) receiving a 3D signal of a scene in P and I frames including animation at the wireframe model;
   c) receiving output signals from the wireframe model, the output signals indicative of the non-zero displacements of nodes and vertices at time $[t_l]$; and
   d) computing, quantizing and arithmetically encoding the prediction error signal as quantized samples.

20. The method of claim 19 further comprising:
   e) coding of P frames using the previous frame as a reference.

21. The method of claim 19 further comprising:
   f) coding of P frames using the previously decoded and reconstructed wireframe at the decoder as a reference.

22. The method of claim 19 further comprising:
   g) coding of I-frames using the reference model as a reference.

23. The method of claim 19 further comprising:
   h) decisioning of coding I or P frame depending on network loss as estimated by an encoder or as requested by a decoder.

24. A medium, executable in a computer system, for coding 3D animated wireframe models suitable for Internet streaming applications, comprises:
   a) program instructions providing a 3D signal representative of a scene expressed in terms of a reference model, I frames and P frames to a 3-D wire frame model expressed in terms of Nodes and Vertices;
   b) program instructions generating a Node Table listing all IndexFace Set nodes in the scene; and
   c) program instructions forming a NodeMask and Vertex Mask in bit form for the 3D wireframe model.

25. A medium, executable in a computer system, for coding 3D animated wireframe models suitable for Internet streaming applications, comprising:
   a) program instructions expressing a 3D animated wireframe model in terms of nodes and vertices
   b) program instructions receiving a 3D signal of a scene in P and I frames including animation at the wireframe model,
   c) program instructions receiving output signals from the wireframe model, the output signals indicative of the non-zero displacements of nodes and vertices at time $[t_l]$; and
   d) program instructions computing, quantizing and arithmetically encoding the prediction error signal as quantized samples.

* * * * *